United States Patent [19]

Stoll

[11] Patent Number: 4,586,535
[45] Date of Patent: May 6, 1986

[54] SOLENOID VALVE UNIT

[76] Inventor: Kurt Stoll, Lenzhalde 72, D-7300 Esslingen, Fed. Rep. of Germany

[21] Appl. No.: 553,059

[22] Filed: Nov. 18, 1983

[30] Foreign Application Priority Data

Nov. 23, 1982 [DE] Fed. Rep. of Germany ....... 3243199

[51] Int. Cl.⁴ ............. F15B 13/043; F15B 13/044
[52] U.S. Cl. .................. 137/596.17; 91/442; 137/102; 137/625.64
[58] Field of Search ............ 137/102, 596.17, 625.64; 91/442

[56] References Cited

U.S. PATENT DOCUMENTS

| 3,895,648 | 7/1975 | Stoll et al. | 137/102 X |
| 3,972,341 | 8/1976 | Wheless | 137/102 |
| 4,187,764 | 2/1980 | Cho | 91/442 |
| 4,519,421 | 5/1985 | Stoll | 137/596.18 X |
| 4,524,803 | 6/1985 | Stoll et al. | 137/625.64 |

FOREIGN PATENT DOCUMENTS

| 2095795 | 10/1982 | Fed. Rep. of Germany | 137/625.64 |
| 40182 | 3/1982 | Japan | 137/625.64 |
| 40183 | 3/1982 | Japan | 137/596.17 |
| 40179 | 3/1982 | Japan | 137/596.17 |

Primary Examiner—Gerald A. Michalsky
Attorney, Agent, or Firm—McGlew and Tuttle

[57] ABSTRACT

A solenoid valve unit for the control of the supply of compressed air to an air driven load and controlling the letting off of such air from the load has a valve housing with a pressure port, a power air port, a let off port for the valve space and a further let off port for the load driven by compressed air. The further pressure let off port is opened up and shut off by a valve plate or thimble that is only moved by pressure. This design makes possible a compact form of the valve so that the pressure port, the power air port and the further pressure let off port are placed on only two housing faces.

11 Claims, 5 Drawing Figures

SOLENOID VALVE UNIT

BACKGROUND OF THE INVENTION

The present invention is with respect to solenoid valve units, and more specially to such units designed for the control of the supply of driving air to a compressed air driven system and letting off of such air therefrom, having a pressure supply port, a pressure outlet port, a let off port for the valve space and a further let off port for the said air driven system.

An account of solenoid valve unit on this lines is to be seen in the U.S. patent application Ser. No. 441,333, now abandoned. The invention of this earlier application may be thought of as a further development of such a solenoid valve unit in the form of a 3/2 solenoid valve. To some degree this earlier invention was based on the idea that the solenoid of a solenoid valve may be designed with a smaller size, as is frequently desired, if the valve member moved thereby is more specially used only for the control of the air current that is under a high pressure. In fact for this air current, only a small flow cross section is needed so that the function of overcoming the pressure forces acting on the valve member may be taken care of by a relatively small solenoid. The letting of the large amounts of expanded air from the air driven system or load is on the other hand controlled by a second valve member by which a large-size, further pressure let-off port may be uncovered or opened up. If for example the air driven system is run on an inlent pressure of roughly 6 atm. and the pressure of the air let off therefrom is roughly 1 atm, the flow cross section for the expanded spent air has to be about 5 to 6 times larger than the flow cross section for the air supplied under a high pressure. If the pressure let off port were to have to be opened or shut with a solenoid valve unit, respresentatively larger valve parts with a respresentatively greater inertia would be needed. Furthermore there would be a parallel increase in the amount of power needed for driving such a valve. If on the other hand in keeping with the invention of said earlier U.S. patent application one has a pressure let off port with a large cross section in the valve member, such port being opened and shut by a pressure-driven second valve member, the solenoid valve unit may be kept for the control of the air current under a high pressure, and not put to any other uses. The outcome is that the unit may be made with a respresentatively smaller, cheaper and more simply controlled solenoid.

In keeping with the basic idea of the invention of said earlier U.S. application Ser. No. 441,333, now abandoned, a solenoid valve unit may take the form of a 3/2 solenoid valve with a valve housing that has a pressure port, a power air outlet port to be joined up with the air driven system or load and a first air let off port. Using the solenoid valve unit it is then possible for the load to be acted upon by compressed air from the compressed air supply, in which respect in a first position of switching of the solenoid valve unit power air outlet port is joined up with the pressure port. The connection of the power outlet port pressurewise with the pressure port is in this respect caused by the motion of a valve member, that is placed inside the valve housing and is drivingly joined up with the armature of the said solenoid. The valve member is more specially loaded towards its resting or neutral position. If the solenoid is acted upon by a current pulse of the right size and form, the valve member is moved out of the resting position into a working position. In the first switching position of the valve member a connection is then produced between the pressure port and the power outlet port of the valve housing. Because of this the air driven load is acted upon by the compressed air. If this condition of operation is to be ended, then the solenoid is so worked that the valve member is moved into a second switching position that is adjusted as may be desired. This second position is for shutting off the air connection between the pressure port and the power outlet port. Once this air connection has been shut down, so that the compressed air supply is shut off from the air driven load, it is necessary for air to be let off at a high speed from the solenoid valve unit on the one hand and the air driven load or system on the other. The valve space from which air is to be let off of the solenoid valve unit, with the valve member placed therein, has in this respect a relatively small volume. The air may be let off therefrom by way of an air let off port with only a small flow cross section, said port being able to be opened and shut, as is known, by the magnetically worked valve member itself. The cross section of the let off port may in this respect be so small that it generally hardly makes any difference to the overall size of the solenoid valve unit and more specially of the solenoid. On the other hand for letting off air from the air driven load it is as a rule necessary for large volumes of expanded, low pressure air to be controlled. In the invention of the said earlier application such control is undertaken by a further pressure let off port having a large cross section, that under the control of a second valve member is joined up with the power air port. The second valve member is not magnetically worked but by the pressure of the air at a point downstream from the first valve member. For this reason the second valve member does not have to be taken into account in selecting the size of the solenoid of the valve unit. On balance the outcome is a system with trouble-free let off of air from large air driven systems using very small solenoid valve units needing little driving power and able to be driven directly from electronic circuits.

The said U.S. patent application has an account of a solenoid valve unit in the form of a 3/2 valve, whose operation is based on the idea noted hereinbefore and having all the parts important for its function integrated into a single valve housing. In this respect a generally coaxial line-up of the parts and structures of the valve is used in which the pressure port and the power air port are placed on opposite sides of the valve housing, whereas the further pressure let off port is placed opening at a third surface of the housing that is at a right angle to the other sides of the housing. In this respect the pressure let off port is so placed as to be running from a hole in the housing between the pressure port and the power air port, the said second valve member being kept in place within this hole. This design makes it necessary for the valve housing to be relatively long seeing that the pressure port, the hole therein and the power air port have to be placed one after the other in it in a row. This form of valve housing takes up much space and this is a shortcoming. On the other hand a design is not as desired if three sides of the valve housing of the solenoid valve unit are taken up partly by ports, such design limiting the uses of the solenoid valve unit and being more specially undesired if the solenoid valve unit is to be joined up with others in part of a modular system.

SHORT GENERAL OUTLINE OF THE PRESENT INVENTION

One purpose of the present invention is that of designing a solenoid valve unit of the sort noted hereinbefore that has a more compact valve housing with ports on less of its sides so that it may be used for building up larger arrays of valves that are placed nearer together than in the prior art.

A further purpose of the invention is to make it possible for such solenoid valve units to be put together with matching pneumatic elements to give a large number of different possible valve forms and combinations.

For effecting these and other purposes that will be clear to an engineer on reading the present specification a solenoid valve unit for controlling the supply to and letting off from of compressed air to and from a compressed air driven load, comprises a valve housing with a pressure port, with a power air port to be joined with said load and with a let off port, a valve member in the valve housing, means for loading said member into a resting position thereof, said valve member being able to be moved between one position in which the power air port is joined with the pressure port and a further position in which the power air port is joined with the let off port, a solenoid for moving the said valve member into one working position, a second valve member have a pressure takeup face to be acted upon by pressure in existence downstream from the first said valve member, said second valve member being designed for controlling an air connection between the power air port and a further pressure let off port having a greater flow cross section than said power air port, said further pressure let off port being formed by one end of a hole in the valve housing running axially therein, one axial end of said hole being joined with a power air duct controlled by said first valve member, said hole further having a cross duct running sideways thereinto, a conical insert in said hole, said insert having a wall spaced from an end of said cross duct, said insert further being frusto-conical and having a narrower end thereof spaced from an end of the power duct, a valve plate means designed to be moved axially in the said hole in the housing and having an outer ring-like lip thereon resting against the bore of the said hole, said valve plate means furthermore being designed to come up against a valve seat at the end of the said power duct.

Further forms of the invention are covered by the dependent claims herein.

A more detailed account of the invention will now be given using the figures which are of two working examples of the invention.

LIST OF THE DIFFERENT VIEWS OF THE FIGURES

DETAILED ACCOUNT OF WORKING EXAMPLES OF THE INVENTION

Figure 1:
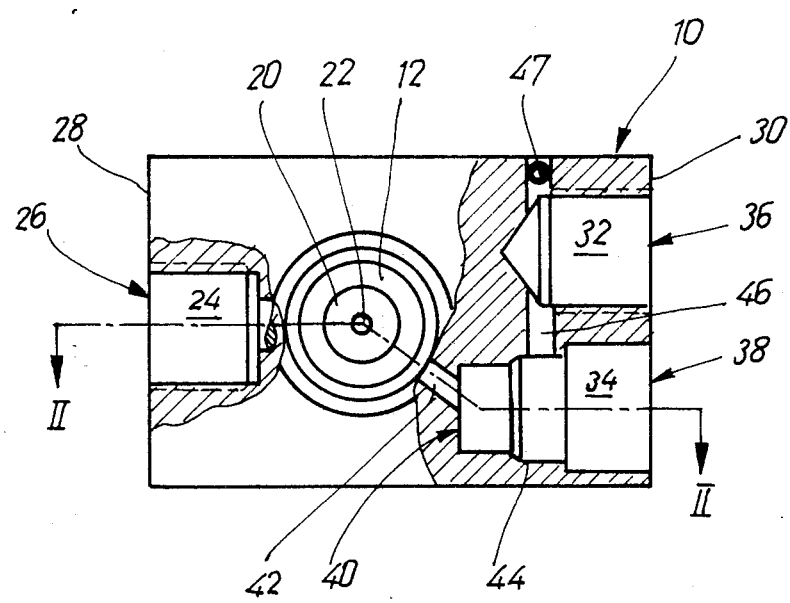
FIG. 1 is a plan view of a partly broken away valve housing of a first form of the solenoid valve unit in keeping with the invention.

Turning to the figures and more specially to FIG. 1, it will be seen that the first working example of the a solenoid valve unit in keeping with invention has a block-like or parallel piped valve housing, that has been generally numbered 10. On its top side 16 the valve housing has a pocket lined with concentric steps, same forming a valve space 12 for a solenoid driven valve member 14. In FIG. 1 only the valve space 12 for the valve member 14 will be seen while on other hand in FIG. 2 the valve member 14 is to be seen in section. The valve member 14 is driven by a solenoid system (not figured), that may be fixed in position over the pocket 12 on the top side 16 of the valve housing 10. The solenoid system may be made up of a more specially ring-like solenoid, in whose the ring-like gap the armature is placed so that it may be moved by magnetic force. The valve member 14 is joined up with this armature and it is so moved in the direction of the two-headed arrow 18, it being seen in the figure to be lifted clear of a valve seat at the axial end of the valve space 12 or chamber. The valve seat is in the form of a flat plate 20 forming part of the floor of the valve space 12. The valve member 14 is moved down onto the plate 20 with a sealing effect by operation of the solenoid and lifted clear of the plate 20 by opening a port in the solenoid valve unit.

The plate 20 has a first flow duct or hole 22 drilled through the middle of it, the hole being coaxial to the valve space 12 and joining it with a further hole 24 (running at a right angle thereto) in the valve housing 10. The hole 24 becomes wider and wider in steps as far a pressure port 26, same opening in one side face 28 of the valve housing 10. It is by way of this pressure port 26 that the solenoid valve unit of the present invention may be joined up with a compressed air supply (not figured). If the valve member 14 is in the lifted position as viewed in FIG. 2, it is then possible for compressed air to make its way from of the compressed air supply through the hole 24 and the hole 22 into the valve space 12. If on the other hand the valve member 14 is lowered down onto the plate 20, the supply of compressed air into the valve space 12 will be shut off. The gage pressure present in the valve space 12 may be let off by way of a let off port that is not figured and is controlled by the valve member 14. The let off port, that may have a very small cross section in view of the very small volume of the valve space 12 from which air is to be let off, is preferably in the housing of the solenoid system.

On the side face 30 opposite to the pressure port 26 of the valve housing 10 thereof are two further holes 32 and 34 in the material of the housing. In this respect a power air port is formed by the port of the hole 32 in the housing and it is by way of this power port that the solenoid valve unit is joined up with the air driven system or load. When the valve member 14 is lifted clear of the plate 20, a connection (on which more details will be given herein) is produced between the pressure port 26 and the load or power port 36 so that the air driven system is supplied with compressed air for running it. If on the other hand the valve member 14 is moved down into sealing contact with the plate 20, the air is let off from the air driven system by way of a further or additional pressure let off port 38, that is formed by the end of the other hole 34 in the housing.

At its one end or base 40 the hole 34 in the housing has a second power air flow duct 42 running to the valve space 12 and controlled by the valve member 14. This power air duct 42 comes to an end at the floor of the valve space 12 so that the same has a connection with the end of the hole 34 in the housing. In the wall face 44 of the hole 34 in the housing there is the end of a cross-duct 46 running to the hole 32 with the power port 36. In the working example of FIG. 1 this cross duct 46 is produced as a hole in the valve housing 10 and the one end thereof is shut off by a ball 47, this making manufacture of the valve unit simpler. Air under pressure coming from the pressure port 26 and making its way through the valve space 12 will all go into the cross duct 46 and then to the power air port 36. In this switching position of the valve the further pressure let off port 38 is shut off by a second valve member in the form of a valve plate 48. More details on the placing of this valve plate or jumper will be given later on in connection with FIG. 2.

There is a conical insert 50 air-tightly fixed in the hole 34 in the housing with the further pressure let off port 38. In a preferred form of the invention the conical insert 50 is kept in place on a shoulder 52 on the bore of the hole 34 in the housing and there is a sealing o-ring 53 between it and the inner all 44 of the hole 34 of the housing. The conical insert 50 generally has the form of a hollow frustum of a cone that is open at one of its ends. The end 54 thereof with a smaller diameter is placed so as to be sticking into the hole 34 of the housing and is spaced by a certain distance from the end of the cross duct 46 at the inner wall face 44 of the hole 34 in the housing. From this it will be seen that there is a ring-like gap between the face 56 of the conical insert 50 and the wall face of the hole 34 in the housing for compressed air to go through.

The end 54 with a smaller diameter of the conical insert 50 takes the form of a seat for the valve plate 48 or jumper, that is able to be moved between the end face 54 and the end 40 of the hole 34 in the housing. In this respect the valve plate 48 may be moved between two possible sealing positions so that in the one position it makes sealing contact with the end face 54 of the conical insert 50 and in the other has the effect of sealing off the air power duct 42 at the end 40 of the hole 34 in the housing. The valve plate 48 is guided by a round skirt-like lip 58 when being so moved, the lip making sealing contact with the bore face 44 of the hole 34 in the housing. In keeping with a preferred form of the invention the valve plate 48 is made generally in the form of a cylindrical structure, whose flat faces may be placed in sealing contact with the housing face at the end 40 of the hole 34 therein and with end face 54 of the conical insert 50. It will be seen that the round lip 58 is at the outer end of the conically widening part of the insert 50. The valve plate will be seen to be in the form of a thimble which is placed over the thinner end of the insert 50. Because of this design of the parts, the lip 58 is able to be moved clear of the inner face 44 of the hole 34 by the effect of the incoming air under pressure. An account will now be given of the switching function of the valve plate 48 produced by this design.

Figure 2:
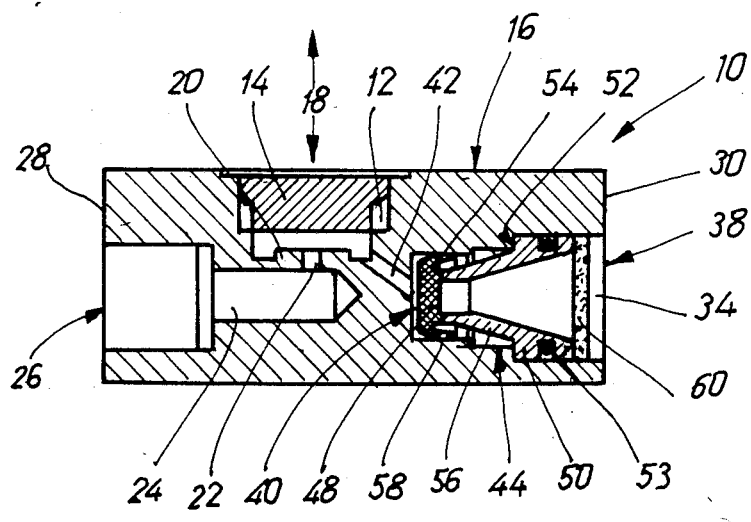
FIG. 2 is a side view of the valve housing with a section taken on the line II—II of FIG. 1, the solenoid-driven valve member being viewed in addition.

If the valve member 14 is in the position to be seen in FIG. 2 in which it is lifted clear of the plate 20, it is possible for the fluid under pressure, more specially compressed air, to make its way through the power air duct 42 into the hole 34 in the housing. In this case the valve 48 will be acted upon by the air on its side facing the end of the power air duct 42 and pushed towards the end face 54 of the conical insert 50, against which it will be sealingly rested. At this same time the round or ring-like lip 58 will be moved clear of the wall face 44 of the hole 34 in the housing under the effect of the compressed air or other gas and at the same time forced inwards. For this reason the compressed air is able to make its way past the valve plate 48 or thimble and the conical insert 50 into the cross duct 46 as far as the power air port 36 so that in this position the air driven system joined up with the air power port 36 will in fact be supplied with compressed air. If now the solenoid valve unit is changed over into its shut position, that is to say the position in which the valve member 14 is lowered sealingly onto the plate 20, the duct 22 will be shut off and the valve space 12 and the power duct 42 will be cut off from the compressed air supply joined up with the pressure port 26. At the same time a let off port (not marked in the figure) will be opened by the valve member 14, through which port the air in the valve space 12 and the power duct 42 may be let off. For this reason there will be a drop in the pressure under the pressure value of the driving air at the power air port 36. Because of this the ring-like lip 58 may be expanded and go back into its sealing position resting against the inner face or bore 44 of the hole 34 in the housing. Nextly the valve plate or thimble 48 is moved clear of the end face 54 of the conical insert 50 because of the backward motion of the compressed air from the air driven system or load and goes into an end position shutting off the power air duct 42. Because of this an air connection is produced through the inside of the conical insert 50 to the further air let off port 38, through which air is quickly let off from the air driven system because of the large cross section of the duct system. The further air let off port 38 may be joined up with a low pressure duct, that takes up the compressed air coming out through the port. However the port 38 may be simply open to the outside air, in which case it is the best to have a muffler and filter 60, for example in the form of a disk of sintered metal, on the pressure let off port 38.

In connection with FIG. 1 it is to be more specially pointed out that very good use is made of the volume of the valve housing 10 so that the solenoid valve unit is very compact. As will be seen from this figure the holes 32 and 34 in the housing for air power port 36 and the further pressure let-off port 38 are placed so that their axes are about parallel. This is made possible by placing the cross duct 46 generally at a right angle to the hole 34 in the housing and the design in keeping with this of the second valve member for controlling the further pressure let off port 38. In keeping with the present invention it will be seen that the power air port 36 and the further air let off port 38 may be placed side by side on one side face 30 of the valve housng 10. It is furthermore possible for the pressure port 26, the air power port 36 and the further pressure let off port 38 to be placed with their axes all parallel and in a single plane, such plane more specially being parallel to the top face 16 of the valve housing 10. The pressure port 26 is in this respect more specially in the middle on the side 30 that is opposite the side with the rest of the openings.

This design in which there is a high degree of symmetry and the connection ports are only placed in two sides 28 and 30 of the valve housing 10 gives specially useful effects when the solenoid valve unit is to be joined up with other pneumatic elements, such as more specially control and automatic control elements. To take an example, the pressure port 26 may have an assembly plate placed in front of it having a distribution main or line and a number of branches coming from a pressure supply for a representative number of solenoid valve units. Furthermore the power air port 36 may be joined up with an automatic control panel having an adjustable pressure control valve thereon. It is then possible for the pressure of the compressed air to be switched by the solenoid valve unit to be changed and matched to the needs of the different loads. The further pressure let off port 38 may be joined up with a noise muffler plate having further muffler elements. By placing the air power port 36 and the further pressure let off port 38 so near together one is able to get the further useful effect of uniting the automatic control plate and the muffling plate into one single structure. The said plates are fixed to the valve housing 10 with the use of sealing elements in the form of rings placed round the ports 26, 36 and 38 of the valve housing 10.

Figure 3:
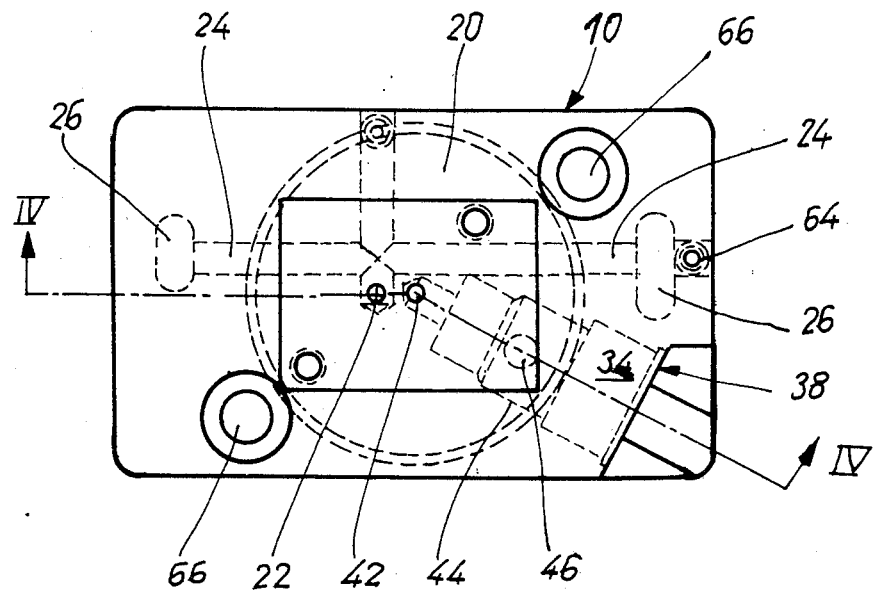
FIG. 3 is a plan view of a valve housing of a second working example of the solenoid valve unit in keeping with the present invention.
Figure 4:
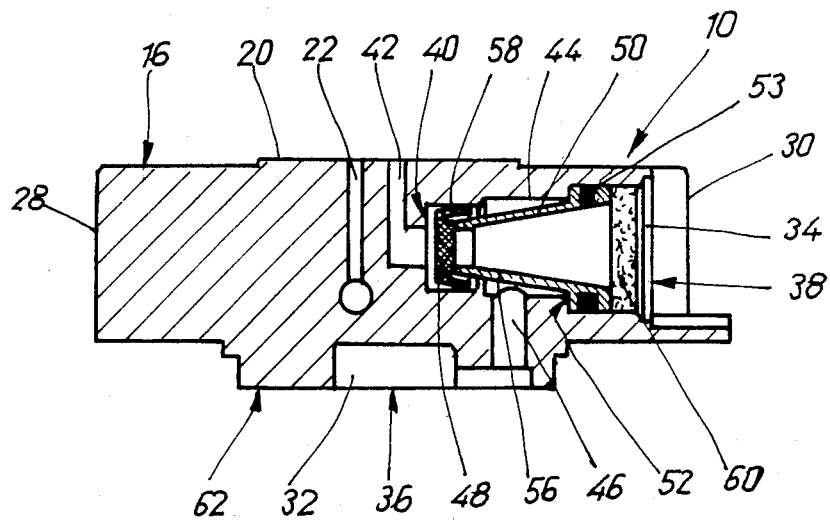
FIG. 4 is a side view of the valve housing with a section taken on the line IV—IV of FIG. 3.

Turning now to the FIGS. 3 and 4 the reader will be able to see a second working example of the invention. Parts thereof that are the same as parts used in the first form of the invention as in FIGS. 1 and 2 have the same part numbers; furthermore the account of the function as given so far may be used in connection with this further form of the invention. In the account now to be given only those details will be touched upon that are different from the first form of the invention.

There is firstly an important difference in connection with the placing of the pressure port 26, the air power port 36 and the further or additional air let off port 38 in the valve housing 10. The pressure port 26 and the air power port 36 are both placed in the lower side 62 of the valve housing 10, whereas the further pressure let off port 38 is placed on the side of the valve housing 10. The lower side 62 of the valve housing 10 has in this respect two pressure ports 26 in it, that are at the end of holes 24 branching from a common duct 22. The pressure ports 26 are preferably in the form of slots and the holes 24 are specially readily produced in the form of a single hole running through the slots so that it is cut across one of the slots and is opening into the other thereof. The single port of the holes 24 so produced is shut off by a ball 64. By having two pressure ports 26 at the lower side 62 of the valve housing 10 a solenoid valve unit is made possible that may be joined up quite freely with other pneumatic elements as part of a modular system. To this end the valve housing 10 is so fixed in position using assembly holes 66 on a part designed therefor that as desired one or the other of the pressure ports 26 may be joined up with connection duct in an in-line position giving an air connection therewith, whereas the other pressure port 26 is shut off by the flange or plate. In this respect the pressure ports 26 take the form of a connection system giving a high degree of interchangeability with other parts of a modular system.

The common hole 22 have the hole 24 branching off from it to the pressure port 26, may for its part be so drilled from the top side 16 in the valve housing 10 that it is cut through the holes 34. The duct 22 comes out at the top side 16 of the valve housing 10 through a plate 20, on which a solenoid device (not figured) having a valve space is sealingly fixed in position. In a way different to the first form of the invention the valve space is not placed in the valve housing 10 but over it. The plate 20 takes the form of a sealing seat for the valve member moved by the solenoid in the valve space so that it may be moved onto the plate 20 or lifted clear thereof.

To the side of the duct 22 there is the upper end of a power duct 42 whose lower end is cut into the one end 40 of a hole 34 running into the housing from the side. The outer end of this hole 34 takes the form of the pressure let off port 38, that as in the first working example of the invention is shut off by a second valve member in the form of the valve plate or thimble 48. There is again a cross duct 46 opening into the hole 34 through the limiting face 44 thereof, said cross duct running to a power air port 36 as formed at the lower end of hole 32 in the housing. The cross duct 46 is placed more or less at a right angle to the hole 34 in the housing, it joining up at its lower end with an angled part of the hole 32, that is placed generally in the middle of the lower face 62 of the valve housing 10.

The valve member as moved by the solenoid system (not figured) is so joined up with the plate 20 on the top side 16 of the valve housing 10 making a sealing join therewith that the duct 22 is shut off. On operation of the solenoid the valve member is lifted clear of the plate 20 and by way of the valve space of the solenoid system a connection is produced between the duct 22 and the power air duct 42. It is in this way that compressed air supplied to the valve housing 10 by way of one of the pressure ports 26 is let into the power air duct 42 and has such an effect on the valve plate 48 or thimble that it is forced clear of the end 40 of the hole 34 in the housing. At the same time the skirt- or ring-like lip 58 of the valve thimble 48 is forced in radially and the air connection with the cross duct opened up. It is then possible for the driving fluid to make its way to load by way of the power port 36, while the further pressure let off port 38 is kept shut. If now the solenoid is switched over into another working position and the valve member moved down onto the plate 20, at the same time a small pressure let off port (not figured) is opened up and the valve thimble 38 so moved by the pressure differential against the end 40 of the hole 34 in the housing that the further pressure let off port 38 is opened. The compressed air load joined up with the power air port 36 is then able to let off its expanded, low pressure air through the further pressure let off opening 38.

The second working example of the invention to be seen in FIGS. 3 and 4 is more specially fitted for use in combination with other pneumatic elements, because all the connection points, that is to say the power air port 36 and two or even more pressure ports 26 are at one side of the valve housing 10, this side being more specially the lower one 62, that is to say the side facing away from the solenoid system. On the other hand the further pressure let off port 38 is on the side of the valve housing 10 (and not on the top or lower face). A design that is more specially compact is one in which the further pressure let off port 38 is placed on one diagonal of the valve housing 10.

Figure 5:
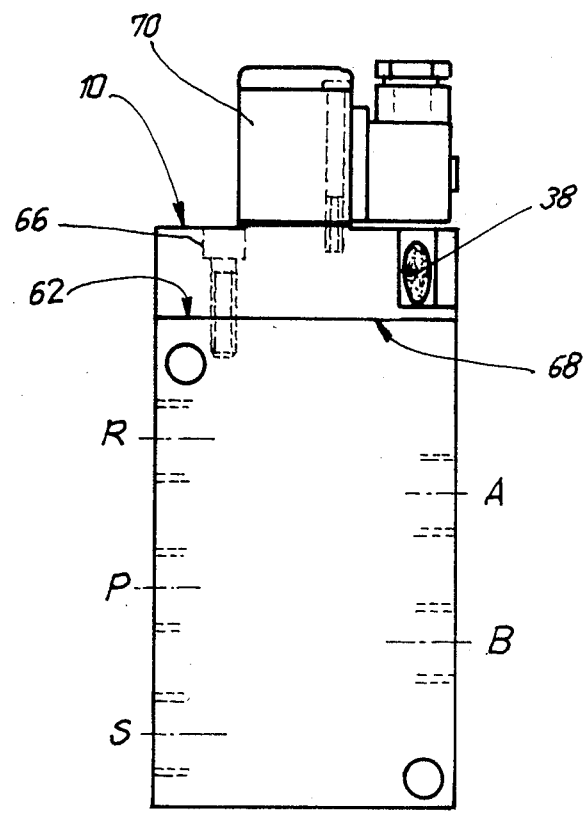
FIG. 5 is a view of a valve unit of the invention in use.

An account will now be given of a preferred use of the second form of the invention using FIG. 5, which at the same time makes clear the combination of the solenoid valve unit with other parts of a pneumatic modular system. In this case the solenoid valve unit takes the form of the switching valve of a pneumatically driven multiway valve with a number of different switching conditions and which in FIG. 5 is in the form of a 5/2 multiway valve. The pressure input port of the valve is marked P, the power air ports are marked A and B and the let off ports are marked R and S. In the first switching condition of the valve the pressure input port P is joined up with the pressure air output port B, whereas the power air output port A is joined up with the let off port R for letting off air. The let off output port is not functioning. In the second switching position of the valve the pressure input port P is joined with the power air port A and the air is let off from the power air port B by way of the air let off port S, whereas the outlet port R is not being used. The changeover between the different switching conditions is caused by a piston (not marked) that is placed inside the valve and is pushed by the air pressure against the force of a return spring. For its part the piston is controlled and moved by the solenoid valve unit in keeping with the invention with the further pressure let off port 38. It will be seen from FIG. 5 that the valve housing 10 is screwed to the multiway valve using the assembly holes 66. In this respect the lower face 62 of the valve housing 10 is placed on the a connection plate 68 of the multiway valve. At this lower face there are the one or more pressure ports 26 of the solenoid valve unit, at least one of the ports having a connection with the pressure input port P of the multiway valve by way of a duct (not marked) coming to an end at the connection plate. Furthermore the power air port 36 of the solenoid valve unit is placed at the lower face 62 of the valve housing 19. By way of a through hole in the connection plate 68 it is joined up with the cylinder, that has the piston running in it for moving the multiway valve. Over the valve housing 10 there is a solenoid system 70 for operation of the solenoid valve unit in the way noted. If the solenoid system 70 is put into operation the piston of the multiway valve is acted upon by compressed air and for this reason the multiway valve is switched over. On the other hand when the solenoid system 70 is switched off, the cylinder of the multiway valve having the piston therein, has air let off from it by way of the further pressure let off port 38 and the piston is moved back by the force of the return spring into it other position answering to the other switching condition of the valve.

The solenoid valve unit in keeping with the present invention may be use on the same lines for the control and driving of one pneumatic elements of a modular system.

I claim:

1. An electromechanically controllable valve unit for the supply of pressure medium to, and the discharge of pressure medium from a load, which valve unit is controllable by a solenoid device having a valve pocket (12) with a valve seat (20), said valve unit comprising: a valve housing (10) having an upper side forming said valve seat (20) and at least a portion of said valve pocket (12); said housing having a first surface bore therein defining a pressure port (26), a second surface bore defining a load port (36) adapted for connection to a load, and a third surface bore defining a pressure relief port (38) for a release of pressure from the load, two of said first, second and third bores being axis-parallel to each other; said housing having a first flow duct (22) therein extending between said valve seat and said pressure port, a second flow duct (42) therein extending between said valve seat and said pressure relief port, and a cross duct (46) therein extending between said pressure relief port and said load port, said third bore defining said pressure relief port having a base (40) through which said second flow duct extends; a hollow conical insert (50) pressure-tightly seated in said third bore having an outer tapered surface spaced inwardly of said third bore, and facing said cross duct (46), and an inner tapered surface with an inner small diameter open end (54) facing and spaced from said base (40) of said third bore, and an opposite large diameter open end (53), said third bore having a seal seat (52) against which said large diameter end (53) is sealingly seated, said large diameter open end facing and spaced from an open end of said third bore; a valve plate (48) movably mounted in said third bore for movement between said base and said inner small diameter end for movement into a first position against said base (40) for closing said second flow duct (42) and into a second position against said inner small diameter end (54) for closing said hollow conical insert, said valve plate having an outer annular lip (58) extending away from said base (40) for permitting the passage of pressure medium therearound with said valve plate in its second position and for being resiliently displaced outwardly against said third bore in its first position so that pressure medium entering said first flow duct to said seat flows through said second flow duct to move said valve plate into its second position and past said valve plate into said cross duct and to said load port, and with flow of pressure medium between said first and second flow ducts blocked, a flow path for pressure medium extending from said load port through said cross duct to move said valve plate into its first position for the passage of pressure medium into said inner small diameter end of said conical insert and out said pressure relief port through an interior of said hollow insert; said first and third surface bores forming said pressure port and said pressure relief port respectively are on different surfaces of said housing; and a disk shaped damping filter (60) extending across said outer large diameter open end and against said conical insert (50) in said third bore and being recessed from an outer surface of said housing for resisting medium flow through said pressure relief port.

2. A valve unit according to claim 1, wherein said third bore forming said pressure relief port (38) includes a shoulder (52), said large diameter outer end (53) of said conical insert being seated against said shoulder and having an O-ring therearound engaged with an interior surface of said third bore.

3. A valve unit according to claim 1, wherein said valve plate (48) includes a central cylindrical base body having opposite surfaces for engaging said base (40) of said third bore and said inner small diameter end (54) of said conical insert respectively, said lip extending annularly outwardly of said cylindrical base body, said annular lip enlarging radially outwardly in a direction away from said base and over at least a portion of said inner small diameter end of said conical insert with said valve plate in its second position.

4. A valve unit according to claim 1, wherein said valve housing has a bottom side opposite from its top side, said first and second bores forming said pressure and load ports (26,36) opening into said bottom side, said housing having a lateral side between said top and bottom sides, said third bore forming said pressure relief port (38) opening into said lateral side.

5. A valve unit according to claim 4, wherein said first surface bore forming said pressure port (26) comprises two separate surface bores in said bottom side of said housing both of which being connected to said first flow duct (22).

6. A valve unit according to claim 1, wherein said valve seat (20) is planar, said first and second flow duct (22,42) opening into said planar valve seat.

7. A valve unit according to claim 1, wherein said housing is rectangular and has rectilinar top, bottom and lateral sides, said pressure relief port (38) extending diagonally with respect to one of said sides.

8. A valve unit according to claim 1, including a further valve plate (14) forming part of a solenoid device movable in said pocket to close and open said valve seat (20).

9. A valve unit according to claim 8 wherein said second and third bores are axis-parallel to each other, said cross duct extending between said second and third bores and at right angles to axes of said second and third bores.

10. A valve unit according to claim 9, wherein axes of said second and third bores lie in a common plane which is parallel to the upper side of said housing.

11. A valve unit according to claim 10 wherein said second and third bores terminate at a side wall of said housing, said first bore terminating at an opposite side wall of said housing opposite from said second and third bores.

* * * * *